(12) United States Patent
Sullivan et al.

(10) Patent No.: US 7,285,059 B2
(45) Date of Patent: *Oct. 23, 2007

(54) GOLF BALL

(75) Inventors: Michael J. Sullivan, Barrington, RI (US); Derek A. Ladd, Acushnet, MA (US); Antonio U. DeSimas, East Providence, RI (US)

(73) Assignee: Acushnet Company, Fairhaven, MA (US)

( * ) Notice: Subject to any disclaimer, the term of this patent is extended or adjusted under 35 U.S.C. 154(b) by 56 days.

This patent is subject to a terminal disclaimer.

(21) Appl. No.: 11/416,869

(22) Filed: May 3, 2006

(65) Prior Publication Data

US 2006/0199668 A1 Sep. 7, 2006

Related U.S. Application Data

(60) Division of application No. 10/844,228, filed on May 12, 2004, now Pat. No. 7,074,137, which is a continuation-in-part of application No. 10/797,699, filed on Mar. 10, 2004, now Pat. No. 6,981,926, which is a continuation-in-part of application No. 10/341,574, filed on Jan. 13, 2003, now Pat. No. 6,852,044, which is a continuation-in-part of application No. 10/002,641, filed on Nov. 28, 2001, now Pat. No. 6,547,677, which is a continuation-in-part of application No. 09/948,692, filed on Sep. 10, 2001, now Pat. No. 7,014,573, which is a continuation-in-part of application No. 09/172,608, filed on Oct. 15, 1998, now Pat. No. 6,302,808, which is a division of application No. 08/943,932, filed on Oct. 3, 1997, now Pat. No. 6,056,842, said application No. 10/797,699 is a continuation-in-part of application No. 09/815,753, filed on Mar. 23, 2001, now Pat. No. 6,494,795.

(51) Int. Cl.
*A63B 37/06* (2006.01)
(52) U.S. Cl. ..................................... 473/376
(58) Field of Classification Search ............. 473/376, 473/373, 374, 367, 368
See application file for complete search history.

(56) References Cited

U.S. PATENT DOCUMENTS

| | | | |
|---|---|---|---|
| 4,508,309 A | 4/1985 | Brown | 249/81 |
| 4,625,964 A | 12/1986 | Yamada | 273/62 |
| 5,048,126 A | 9/1991 | McLaughlin | 2/125 |
| 5,104,126 A | 4/1992 | Gentiluomo | 273/228 |
| 5,184,828 A | 2/1993 | Kim et al. | 273/228 |
| 5,273,286 A | 12/1993 | Sun | 273/228 |
| 5,334,673 A | 8/1994 | Wu | 273/235 R |
| 5,482,285 A | 1/1996 | Yabuki et al. | 273/228 |
| 5,743,816 A | 4/1998 | Ohsumi et al. | 473/376 |
| 5,772,531 A | 6/1998 | Ohsumi et al. | 473/376 |
| 5,824,746 A | 10/1998 | Harris et al. | 525/196 |
| 5,908,358 A | 6/1999 | Wu | 473/378 |
| 5,919,100 A | 7/1999 | Boehm et al. | 473/354 |
| 5,929,189 A | 7/1999 | Ichikawa et al. | 528/76 |

(Continued)

*Primary Examiner*—Raeann Trimiew
(74) *Attorney, Agent, or Firm*—D. Michael Burns

(57) ABSTRACT

The present invention is directed towards a multi-layered core golf ball that comprises a thermoplastic inner casing layer molded between two core layers to create a faster golf ball with less spin, by designing a ball that has more of the stored energy of the core released at impact. One inner casing layer and/or an outer core layer is comprised of a partially or fully neutralized ionomer.

25 Claims, 9 Drawing Sheets

U.S. PATENT DOCUMENTS

| | | | |
|---|---|---|---|
| 5,971,870 A | 10/1999 | Sullivan et al. | 473/373 |
| 6,025,442 A | 2/2000 | Harris et al. | 525/221 |
| 6,056,842 A | 5/2000 | Dalton et al. | 156/243 |
| 6,117,024 A | 9/2000 | Dewanjee | 473/351 |
| 6,120,393 A | 9/2000 | Sullivan et al. | 473/377 |
| 6,142,887 A | 11/2000 | Sullivan et al. | 473/374 |
| 6,210,294 B1 | 4/2001 | Wu | 473/377 |
| 6,302,808 B1 | 10/2001 | Dalton et al. | 473/371 |
| 6,309,313 B1 | 10/2001 | Peter | 473/377 |
| 6,476,176 B1 | 11/2002 | Wu | 528/76 |
| 6,653,382 B1 | 11/2003 | Statz et al. | 524/400 |
| 7,074,137 B2 * | 7/2006 | Sullivan et al. | 473/376 |
| 2002/0019268 A1 | 2/2002 | Tsunoda et al. | 473/351 |
| 2003/0050373 A1 | 3/2003 | Chen et al. | 524/322 |
| 2003/0114565 A1 | 6/2003 | Chen et al. | 524/322 |
| 2003/0130434 A1 | 7/2003 | Statz et al. | 525/329.5 |

* cited by examiner

GOLF BALL

CROSS REFERENCE TO RELATED APPLICATIONS

This application is a divisional of U S. patent application Ser. No. 10/844,228. filed May 12, 2004 now U.S. Pat. No. 7,074,137, which is a continuation-in-part of U.S. patent application Ser, No. 10/797,699, filed Mar. 10, 2004, now U.S. Pat. No. 6,981,926, which is a continuation-in-part of U.S. patent application Ser. No. 10/341,574, filed Jan. 13, 2003, now U.S. Pat. No. 6,852,044, which is a continuation-in-part of U.S. patent application Ser. No. 10/002,641, filed Nov. 28, 2001, now U.S. Pat. No. 6,547,677, which is a continuation-in-part of U.S. patent application Ser. No. 09/948,692, filed Sep. 10, 2001 now U.S. Pat. No. 7,014,573, which is a continuation-in-part of U.S. patent application Ser. No. 09/172,608, filed Oct. 15, 1998, now U.S. Pat. No. 6,302,808, which is a division of U.S. patent application Ser. No. 08/943,932, filed Oct. 3, 1997, now U.S. Pat. No. 6,056,842; also the application is a continuation-in-part of U.S. patent application Ser. No. 09/815,753, filed Mar. 23, 2001 now U.S. Pat. No. 6,494,795, the disclosures of which are hereby incorporated by reference in their entirety.

FIELD OF THE INVENTION

The present invention relates to golf balls and more particularly, the invention is directed to creating a faster golf ball with less spin. The present invention is also directed to golf balls comprised of a multi-layered or multi-piece core, one of the intermediate core comprises a fully neutralized polymer.

BACKGROUND OF THE INVENTION

The spin rate of golf balls is the end result of many variables, one of which is the distribution of the density or specific gravity within the ball. Spin rate is an important characteristic of golf balls for both skilled and recreational golfers. High spin rate allows the more skilled players, such as PGA professionals and low handicapped players, to maximize control of the golf ball. A high spin rate golf ball is advantageous for an approach shot to the green. The ability to produce and control back spin to stop the ball on the green and side spin to draw or fade the ball substantially improves a player's control over the ball. Hence, the more skilled players generally prefer a golf ball that exhibits high spin rate, in part, off scoring irons (7-PW).

On the other hand, the recreational players who cannot intentionally control the spin of the ball generally do not prefer a high spin rate golf ball. For these players, slicing and hooking the ball are the more immediate obstacles. When a club head strikes a ball improperly, an unintentional side spin is often imparted to the ball, which sends the ball off its intended course. The side spin reduces a player's control over the ball, as well as the direct-line distance the ball will travel. A golf ball that spins less tends not to drift off-line erratically if the shot is not hit squarely with the club face. A low spin ball will not cure the hook or slice, but will reduce the adverse effects of the side spin. Hence, recreational players typically prefer a golf ball that exhibits low spin rate.

Reallocating the density or specific gravity of the various layers of a golf ball provides an important means of controlling the spin rate. In some instances, the weight from the outer portions of the ball is redistributed toward the center to decrease the moment of inertia, thereby increasing the spin rate. For example, U.S. Pat. No. 4,625,964 discloses a golf ball with a reduced moment of inertia having a core with specific gravity of at least 1.50 and a diameter of less than 32 mm and an intermediate layer of lower specific gravity between the core and the cover. U.S. Pat. No. 5,104,126 discloses a ball with a dense inner core having a specific gravity of at least 1.25 encapsulated by a lower density syntactic foam composition. U.S. Pat. No. 5,048,838 discloses another golf ball with a dense inner core having a diameter in the range of 15-25 mm with a specific gravity of 1.2 to 4.0 and an outer layer with a specific gravity of 0.1 to 3.0 less than the specific gravity of the inner core. U.S. Pat. No. 5,482,285 discloses another golf ball with reduced moment of inertia by reducing the specific gravity of an outer core to 0.2 to 1.0.

In other instances, the weight from the inner portion of the ball is redistributed outward to increase the moment of inertia, thereby decreasing the spin rate. U.S. Pat. No. 6,120,393 discloses a golf ball with a hollow inner layer with one or more resilient outer layers, thereby giving the ball a soft core, and a hard cover U.S. Pat. No. 6,142,887 discloses an increased moment of inertia golf ball comprising one or more layer layers made from metals, ceramic or composite materials, and a polymeric spherical substrate disposed inwardly from the layer layers.

These and other references disclose specific examples of high and low spin rate ball with ranges of specific gravity, ranges of diameter for the core, and ranges of thickness for the outer layers, for example. They, however, do not offer any universal guidelines to control the spin rate of golf balls. One particular area of concern is that soft compression core golf balls have not been successful in utilizing their stored energy at high speeds, and they also tend to lack impact strength. Hence, there remains a need in the art to create a ball with less spin, yet will be more efficient in releasing its stored energy.

SUMMARY OF THE INVENTION

The present invention is directed to a golf ball with a thermoplastic layer molded between two layers to create a faster golf ball with less spin. The ball has a generally hard inner core having a specific gravity of less than 1.05 g/cc with a compression greater than 70 Atti, and a generally soft outer core layer, wherein an inner casing layer is disposed sandwiched between the inner core and he outer core layers. The inner casing has a flex modulus greater than 30,000 psi. Preferably, the thermoplastic layer comprises a highly neutralized polymer.

The outer core layer is formed from a thermoplastic material comprising less than 20 phr of zinc diacrylate.

The present invention provides a golf ball designed to more fully utilize the stored energy of the core at high speeds and provides for an improvement in impact strength and a more heavily filled outer casing layer to reduce the spin characteristics of the ball.

The present invention is also directed to an improved golf ball having a core comprised of a center and multiple core layers to improve the playing characteristics of the golf ball. More particularly, the invention comprises a golf ball having a multi-layer or multi-piece core comprising an innermost core and at least one outer core layer wherein at least one core layer comprises a highly neutralized polymer. The center is preferably comprised of a thermoset composition such as high cis or trans polybutadiene or may comprise a thermoset or thermoplastic metallocene such as polybutadiene, polyethylene copolymer, or highly neutralized polymer.

At least one core layer should be significantly stiffer and harder than the innermost core. At least one layer has a Shore C hardness of greater than 80 and preferably greater than 85 with a flex modulus of greater than about 30,000 psi and preferably, greater than 40,000 psi.

At least one outermost core layer has a specific gravity of greater than 1.25 g/cc, preferably greater than 1.50 g/cc, and most preferably greater than 1.75 g/cc therein increasing the moment of inertia of the overall golf ball and thereby lowering the spin rates. This outermost core layer may be heavily filled with density increasing material while the center and any intermediate core layers may be filled with a density reducing material, preferably greater than 2 g/cc, more preferably greater than 5 g/cc and most preferably greater than 10 g/cc.

The invention also provides for a single core layer to serve all the above functions: stiffness greater than the center; and high specific gravity away from the center.

The cover comprises one or more layers of soft material that supplies high partial wedge spin and good durability. This material can be a cast or reaction-injection molded polyurethane, polyurea, polyurethane-ionomer or a thermoplastic such as a thermoplastic urethane, partially or fully neutralized ionomer, metallocene or other single site catalyzed polymer, or blends thereof. The cover will preferably have a Shore D hardness of less than 65 and a thickness of from about 0.010 to 0.100 inches, more preferably from 0.020 to 0.040 inches. Preferably, the cover comprises a single layer.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
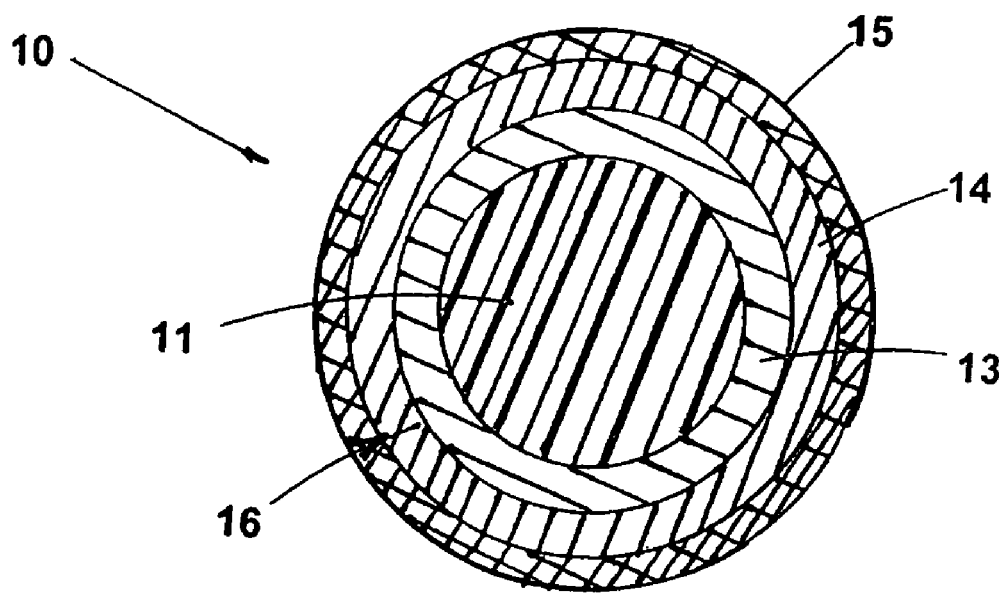
FIG. 1 is a cross-sectional view of a golf ball formed according to the present disclosure having two outer core layers.
Figure 2:
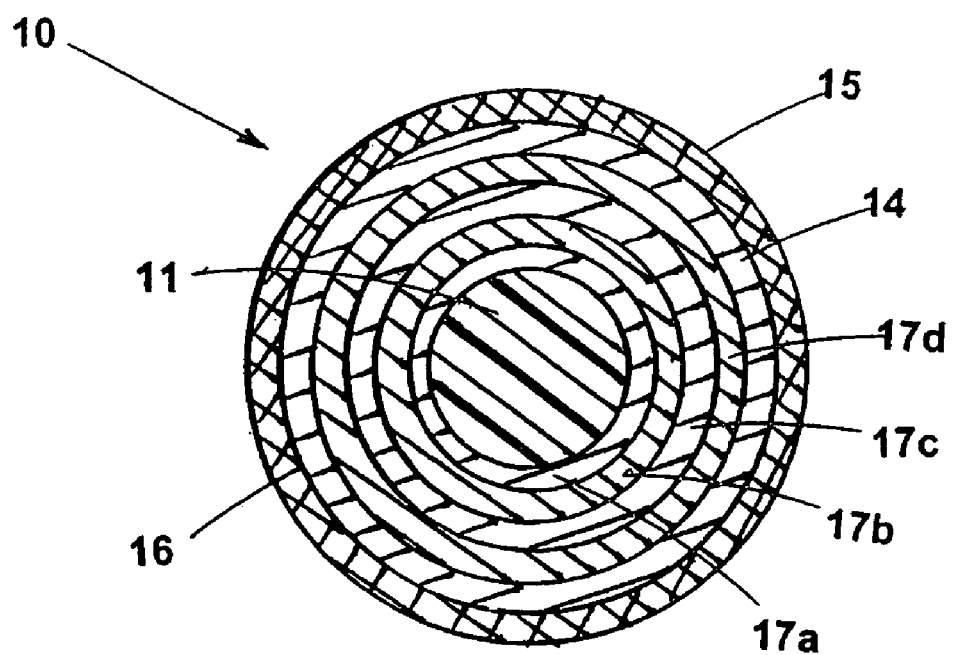
FIG. 2 is a cross-sectional view of a golf ball formed according to the present disclosure showing five outer core layers.

Referring to FIGS. 1 and 2, golf ball 10 includes a core 16 and a cover 15. Core 16 includes a center 11, and at least one core layer. FIG. 1 depicts an embodiment of the invention having two outer core layers, an intermediate core layer 13 and a relatively rigid outermost core layer 14. However, FIG. 2 describes an embodiment having five core layers. They are: a first intermediate core layer 17a, a second intermediate core layer 17b, a third intermediate core layer 17c, a fourth intermediate core layer 17d, and a fifth core layer which is generally very rigid, also referred to as the outermost core layer 14.

Referring to FIG. 2, the center 11 is preferably formed by compression molding a sphere from a prep of center material. Compression molding solid centers is well known in the art.

Figure 3:
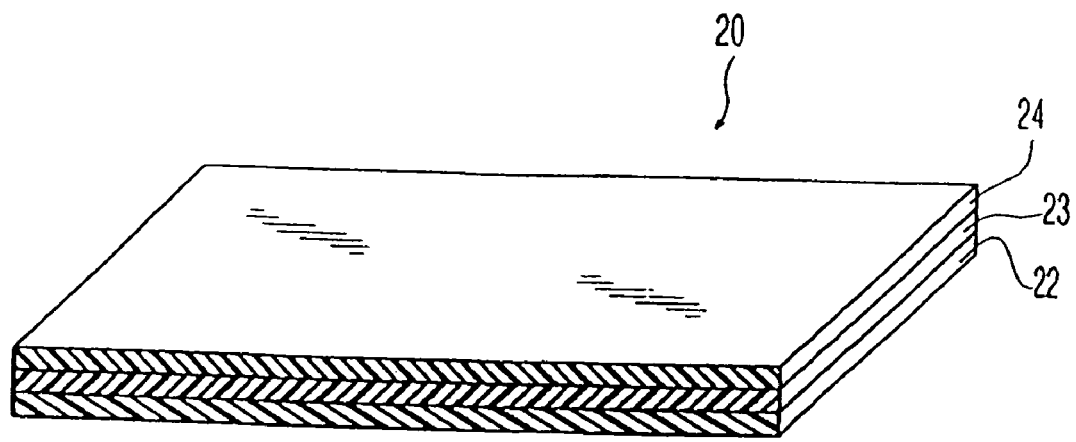
FIG. 3 is a perspective view of a laminate comprising three layers of core material.
Figure 4:
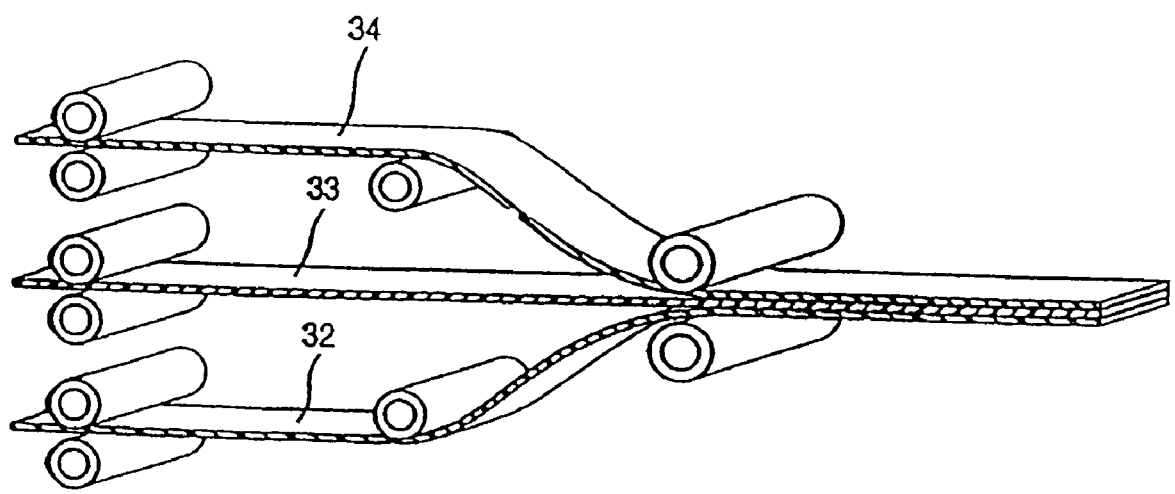
FIG. 4 is a sectional view of rollers and material being formed into the laminate of core material.
Figure 5:
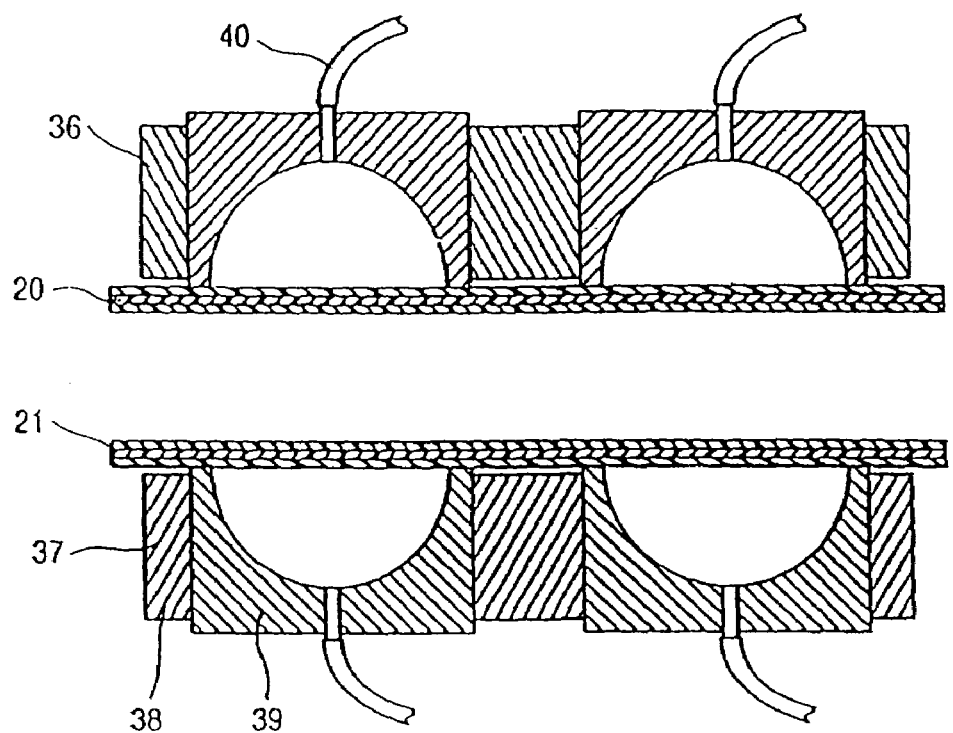
FIG. 5 is a sectional view of a mold for forming multiple layers about a core center according to the present disclosure.
Figure 6:
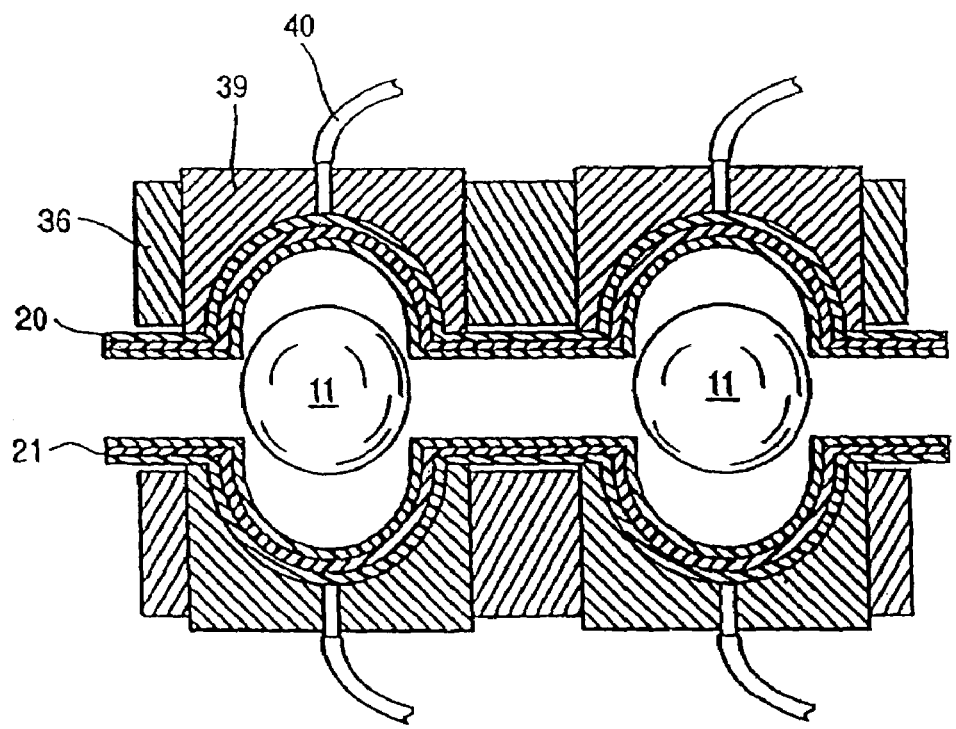
FIG. 6 is a sectional view of a mold forming multiple layers about a core center according to the disclosure with the mold-forming sheets being vacuum formed within the mold.

Referring to FIGS. 3 and 4, in order to form multiple layers around the center in a first embodiment of the invention, preferably a laminate 20 is formed. The laminate 20 is comprised of at least two layers and preferably three layers 22, 23 and 24. The laminate 20 is formed from the rolling of thin sheets 32, 33, and 34 from a core material. More particularly, each sheet is formed to a thickness that is slightly larger than the thickness of the layers 12, 13 and 14 in the finished golf ball 10. The thickness of each may be varied, but all have a thickness preferably of about 0.010 to about 0.100 inches and more preferably from about 0.015 to 0.050 inches thick. Preferably, the sheets 32, 33, 34 are prepared by mixing the uncured core material to be used for each layer and calendar rolling the material into sheets. The sheets are stacked together to form the laminate 20 having three layers 22, 23 and 24 using calendar rolling mills. The sheets could also be made by extrusion. The sheets 32, 33 and 34 should have very uniform thickness i.e. the thickness of each sheet should not vary more than about 0.005 inch.

In another embodiment, the laminate 20 can be further constructed using an adhesive between each layer of material. Preferably, an epoxy resin such as Epoxy Resin #1028 from RBC Industries in Warwick, R.I. is used. The adhesive should have good shear and tensile strength and, preferably the adhesive should have a tensile strength over about 1500 psi. Still further, the adhesive should not become brittle when cured. An adhesive having a Shore D hardness of less than 60 when cured is preferred. The adhesive layer applied to the sheets should be very thin and preferably, less than about 0.004 inch thick.

Referring to FIGS. 5 through 8, the next step in the method of the present invention is to form multiple layers around the center. This is preferably accomplished by placing the two laminates 20 and 21 in between a top mold 36 and a bottom mold 37. The molds 36 and 37 are comprised of mold frames 38 and replaceable mold halves 39 such as that described in U.S. Pat. No. 4,508,309 issued to Brown. The laminates 20 and 21 are formed to the cavities in the mold halves 39. Preferably, the laminates are suction formed by using a vacuum source 40. The vacuum source 40 suction forms the laminates 20 and 21 to the half mold cavities 39 so that uniformity in layer thickness is maintained. Centers 11 are inserted between the laminates after the laminates 20 and 21 have been formed to the cavities and the laminates 20 and 21 are compression molded about the centers 11 under conditions of temperature and, pressure that are well known in the art.

Figure 7:
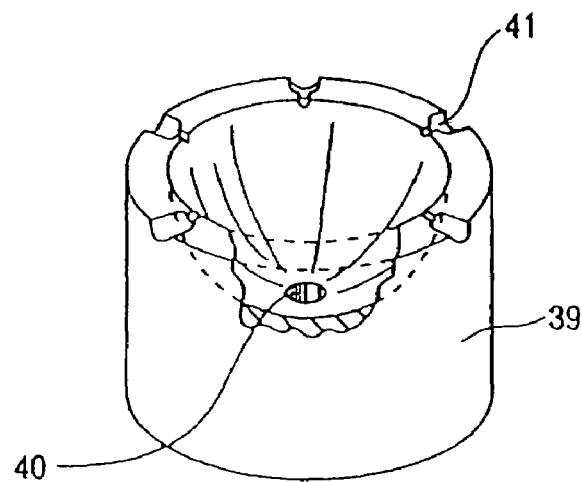
FIG. 7 is a perspective view of a half mold used in forming multiple layers about core centers in accordance with the disclosure.
Figure 8:
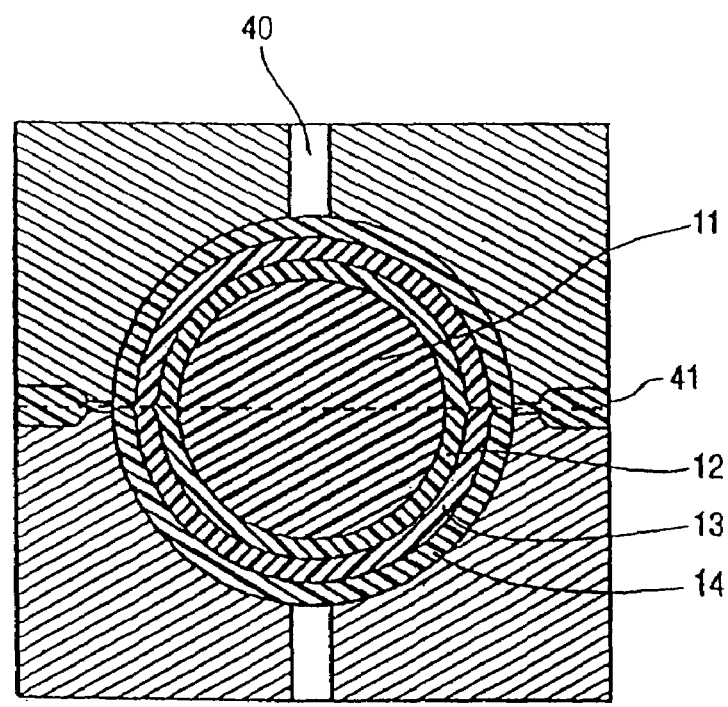
FIG. 8 is a cross-sectional view of a compression mold of a golf ball core according to the disclosure.
Figure 9:
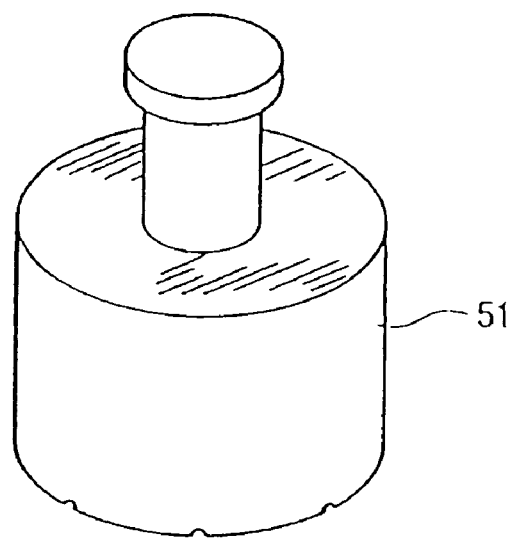
FIG. 9 is an exploded view of a golf ball core according to the disclosure in a retractable-pin injection mold.
Figure 9:
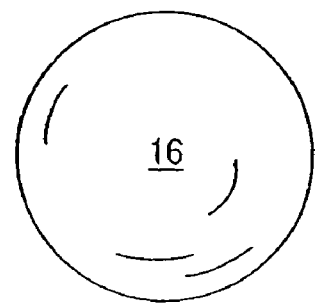
Figure 9:
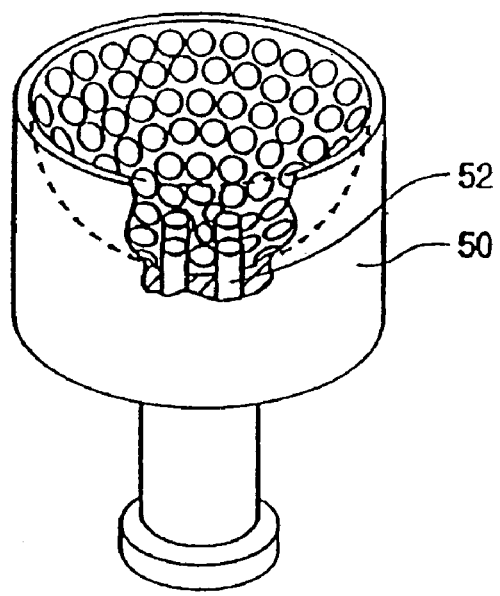

Referring to FIGS. 7 and 8, the half molds 39 have a plurality of vents 41. The compression molding step includes flowing excess layer material from the laminates 20 and 21 through at least three vents 41 so that the flow of laminate material is symmetrical about the center 11 and the center 11 does not shift due to lateral flow patterns. Preferably, the half molds 39 have 4 to 6 vents.

Referring to FIGS. 9 through 12, the next step in the present invention is to form a cover 15 around the core 16. The core 16, comprised of center 11 and outer layers 12, 13 and 14, is supported within a pair of cover mold-halves 50 and 51 by a plurality of retractable pins 52. The retractable pins 52 are actuated by conventional means well known to those of ordinary skill in the art of mold design.

After the mold-halves 50 and 51 are closed together with the pins 52 supporting the core 16, the cover material is injected into the mold in a liquid state through a plurality of injection ports or gates 49. Gates 49 can be edge gates or sub-gates. With edge gates, the resultant golf balls are all interconnected and may be removed from the mold-halves 50 and 51 together in a large matrix. Sub-gating automatically separates the mold runner from the golf balls during the ejection of the golf balls from mold-halves 50 and 51.

Figure 10:
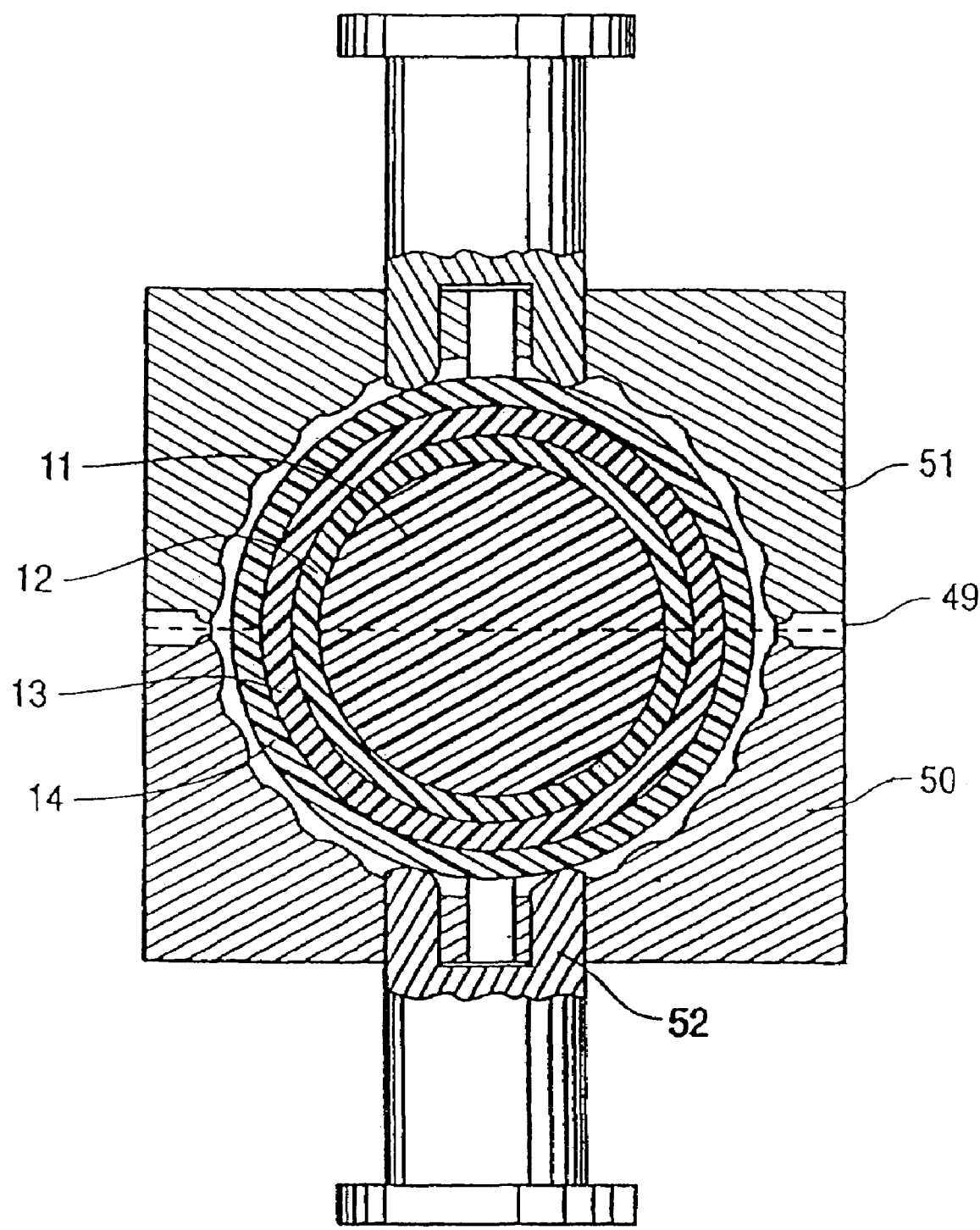
FIG. 10 is a cross-sectional view of a golf ball core according to the disclosure in a retractable-pin injection mold.
Figure 11:
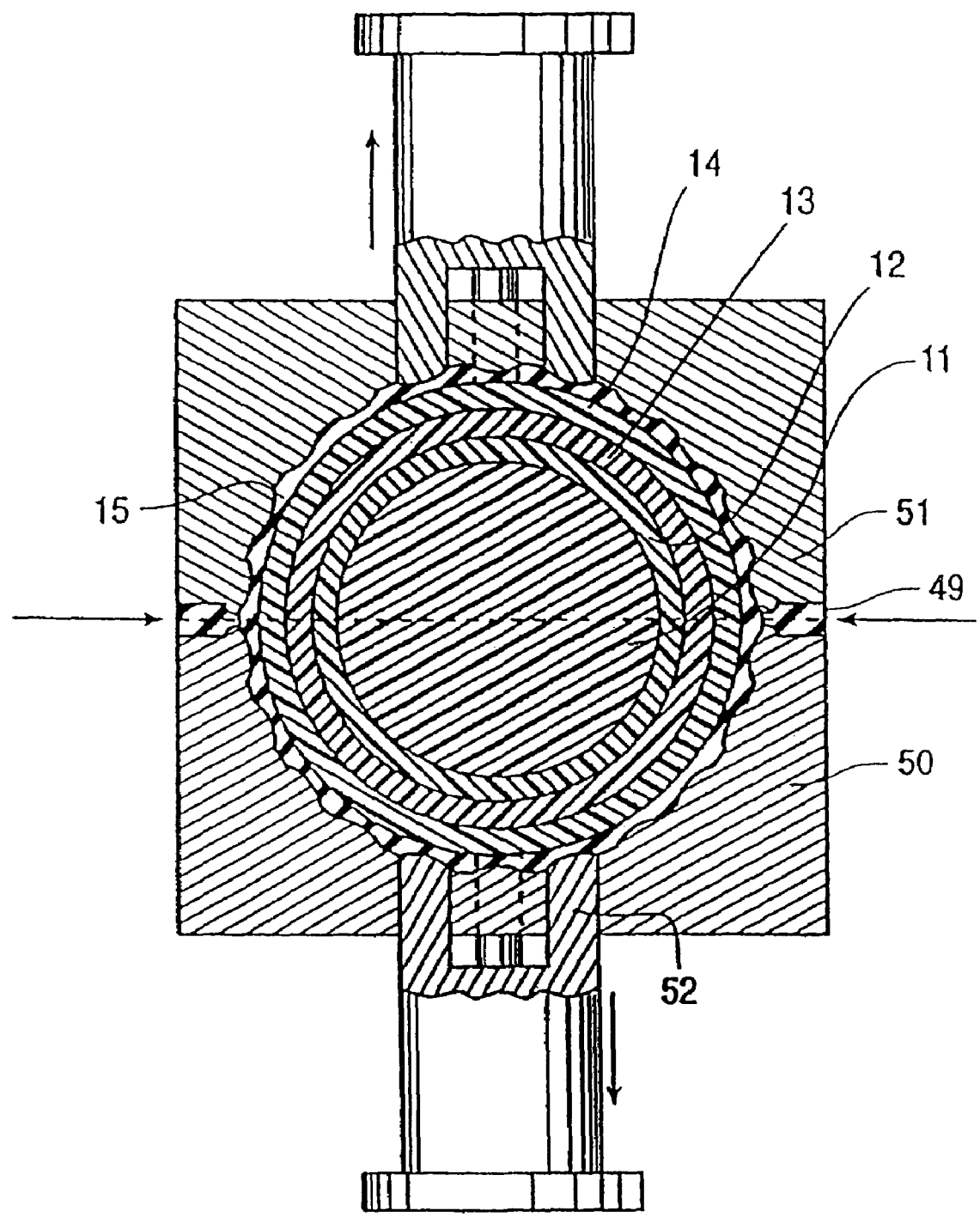
FIG. 11 is a cross-sectional view of a golf ball according to the disclosure in a retractable-pin mold.

Referring to FIGS. 10 and 11, retractable pins 52 are retracted after a predetermined amount of cover material has been injected into the mold-halves 50 and 51. The predetermined amount of cover material is substantially all of the material to be injected. Thus, the core 16 is substantially surrounded by cover material and does not shift when the retractable pins 52 are removed. This allows the liquid cover material to flow and substantially fill the cavity between the core 16 and the mold-halves 50 and 51. At the same time, concentricity is maintained between the core 16 and the mold-halves 50 and 51.

The cover material is allowed to solidify around the core 16, thereby forming cover 15. Golf ball 10 is then ejected from mold-halves 50 and 51, and finished using processes which are well known in the art. The temperatures and curing time for mold-halves 50 and 51 are generally known in the art and are dependent on the material that is being used for cover 15, which will be discussed in more detail below.

Figure 12:
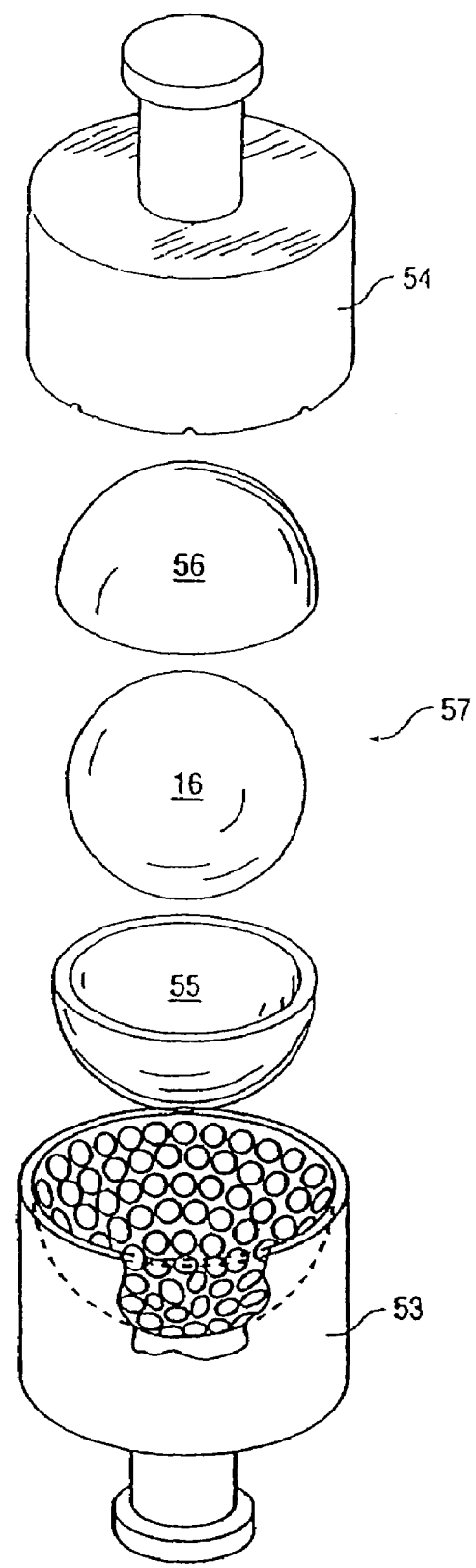
FIG. 12 is an exploded view of a golf ball core according to the disclosure with cover layer hemispheres in a compression mold.

Referring to FIG. 12, an alternative method of forming the cover 15 according to the invention is shown. Two cover layer hemispheres 55 and 56 are pre-formed of the desired cover material, preferably, by an injection molding process. The hemispheres 55 and 56 are positioned around core 16 thereby forming an assembly 57 that is then placed into a compression mold 58, which comprises two compression mold-halves 53 and 54. Mold-halves 53 and 54 are advanced toward each other until their mating surfaces touch, and the mold 58 is heated to melt the hemispheres. Mold-halves 53 and 54 compress and heat the hemispheres 55 and 56 about the core 16 to mold the cover material thereto.

Referring back to FIGS. 1-2, the overall diameter of the core 16 is greater than about 1.50 inches, preferably greater than 1.58 inches and most preferably greater than about 1.60 inches. The center 11 has a Shore C surface hardness of less than about 85, preferably less than about 70. The center 11 has a compression of less than about 90, preferably less than about 80 and most preferably less than about 70, and additionally has a COR value greater than about 0.700, preferably greater than about 0.750, and most preferably greater than about 0.800.

One conventional technique for measuring COR uses a golf ball or golf ball sub-assembly, air cannon, and a stationary vertical steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. Unless noted otherwise, all COR data presented in this application are measured using a speed of 125 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period.

Another method for measuring COR uses a substantially fixed titanium disk. The titanium disk intending to simulate a golf club is circular, and has a diameter of about 4 inches, and has a mass of about 200 grams. The impact face of the titanium disk may also be flexible and has its own coefficient of restitution, as discussed further below. The disk is mounted on an X-Y-Z table so that its position can be adjusted relative to the launching device prior to testing. A pair of ballistic light screens are spaced apart and located between the launching device and the titanium disk. The ball is fired from the launching device toward the titanium disk at a predetermined test velocity. As the ball travels toward the titanium disk, it activates each light screen so that the time period to transit between the light screens is measured. This provides an incoming transit time period proportional to the ball's incoming velocity. The ball impacts the titanium disk, and rebounds through the light screens which measure the time period to transit between the light screens. This provides an outgoing transit time period proportional to the ball's outgoing velocity. The COR can be calculated by the ratio of the outgoing time difference to the incoming time difference.

Compression is measured by applying a spring-loaded force to the golf ball center, golf ball core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch against this spring. If the spring, in turn, compresses 0.2 inch, the compression is rated at 100; if the spring compresses 0.1 inch, the compression value is rated as 0. Thus more compressible, softer materials will have a lower Atti gauge values than harder, less compressible materials. Compression measured with this instrument is also referred to as PGA compression. The center 11 may be a thermoset composition such as high cis or trans polybutadiene or may may comprise a thermoset or thermoplastic metallocene (or other single site catalyzed polyolefin) such as a polybutadiene, polyethylene copolymer, or EPR or EPDM. In the case of metallocenes, the polymer may be cross-linked with a free radical source such as peroxide or by high-energy radiation. It is highly desirable that the center 11 be soft and fast. The diameter of the center 11 is not critical but since a thin outer core layer(s) is desirable it should be greater than about 1.00 inch and may be much higher, up to an outer diameter of about 1.62 inches.

The enclosing two or more core layers of FIG. 1, may comprise the same materials or even different compositions as disclosed above for the center 11, but at least one core layer must be significantly different in stiffness and hardness than the center 11. At least one of the layers 12-14 has a Shore C hardness of greater than 80 and preferably greater than 85 with a flex modulus (per ASTM D-6272-98 measured about two weeks after the sample is molded) of greater than about 30,000 psi. Additionally, at least one core layer, 12-14, has a specific gravity of greater than 1.25 g/cc, preferably greater than 1.50 g/cc and most preferably greater than 1.75 g/cc. This will increase the moment of inertia of the overall ball, and subsequently lower spin rates when a driver golf club is used. This may be coupled with the use of unfilled or even foamed density reducing material to reduce specific gravity of the center 11 and any inner core laminate layers 12-13 to further increase the moment of inertia of the ball. Each outer core layer 12-14 has a thickness of from 0.001 to 0.100 inches and preferably from about 0.015 to 0.050 inches. Optionally, one or more layers 12-14 may serve as moisture barrier layers that will protect against reduced COR values, due to moisture take-up by the center 11. The use of moisture barriers is described in U.S. Pat No. 6,632,147, which is incorporated by reference herein in its entirety. FIG. 1 further describes an embodiment of the invention wherein a single layer 14 serves one or more of the functions described above, i.e. stiffness, high specific gravity, and moisture barrier. More specifically, one or more layers 12-14 having a moisture vapor transmission rate that is less than that of the cover.

The cover 15 comprises one or more layers of a relatively soft material that supplies high partial spin to the ball when struck by a wedge club. Preferably, the cover 15 comprises a single layer. The cover 15 should have good durability as provided by cast polyurethane, polyurea, polyurethane ionomer, or a thermoplastic such as a thermoplastic urethane, ionomer blend, fusabond, etc. It should have a Shore D hardness or less than 65, preferably less than 60, and preferably have a thickness of from about 0.010 to 0.055 inches, more preferably from about 0.020 to 0.040 inches. While multi-layered covers may be employed to fine tune spin and feel, the present invention does not require them to provide optimal performance.

Figure 13:
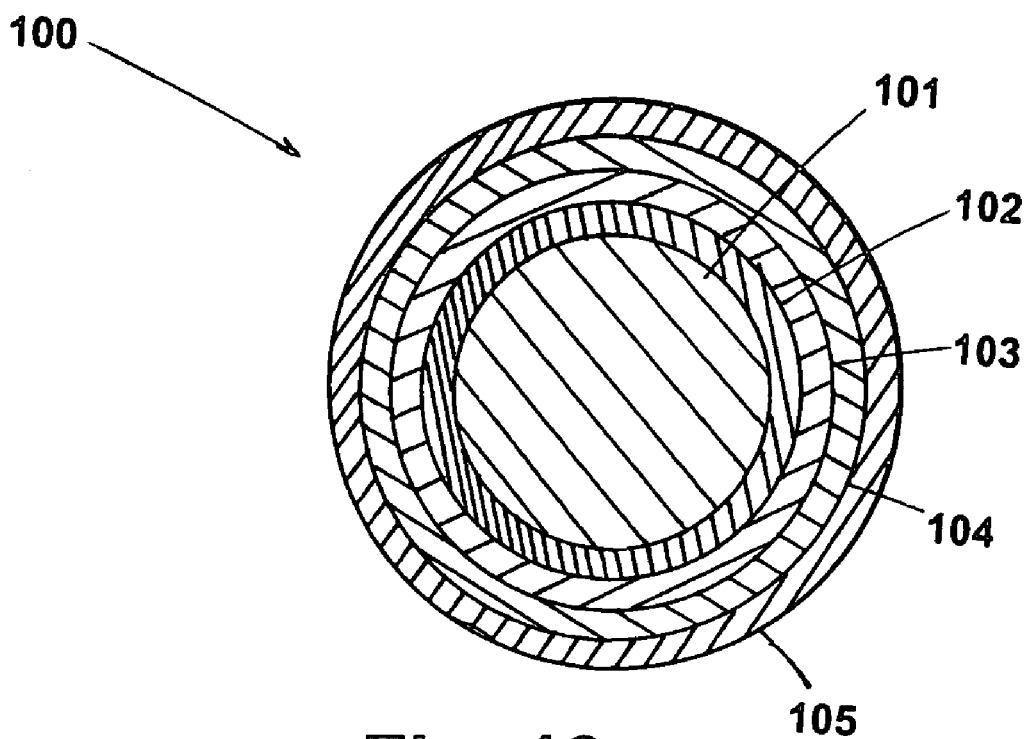
FIG. 13 is a cross-sectional view of a golf ball 30 having an inner core 32, at least two casing layers 34, 36, an outer core layer 38, and an outer cover layer in accordance with the disclosure.
Figure 14:
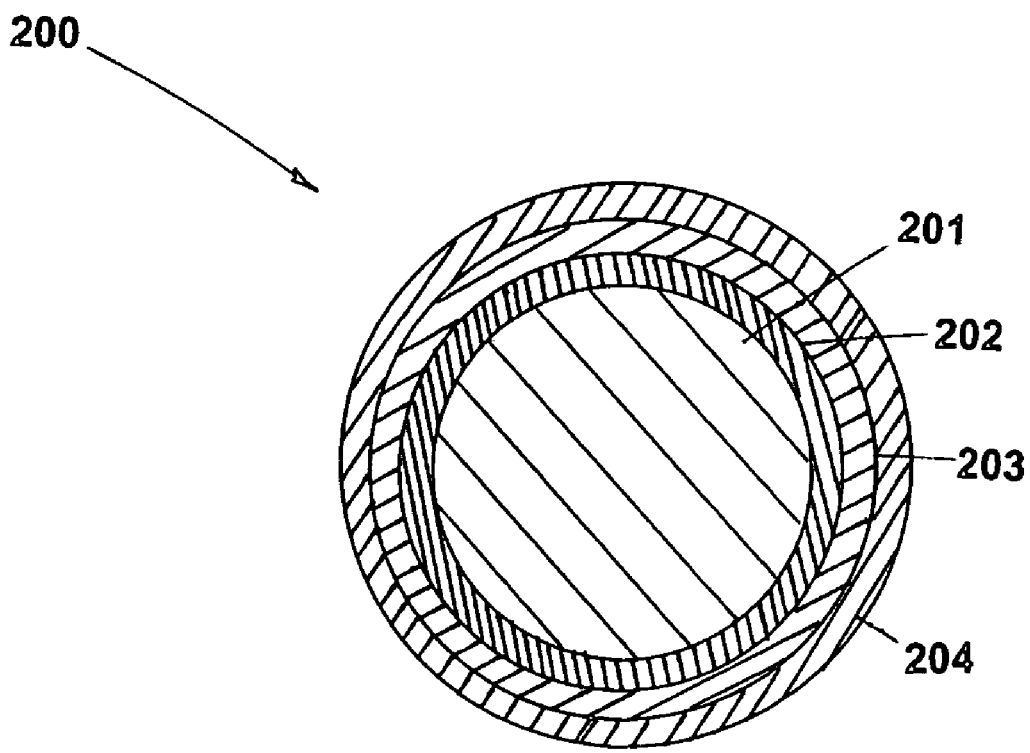
FIG. 14 is a cross-sectional view of a golf ball 40 having inner core 42, at least one casing layer 44, an outer core layer 46, and an outer cover 48 in accordance with the disclosure.

Referring generally to FIGS. 13 and 14, golf balls 100 and 200 are shown. It is well known that the total weight of the ball has to conform to the weight limit set by the United States Golf Association ("USGA"). Redistributing the weight or mass of the ball either toward the center of the ball or toward the outer surface of the ball changes the dynamic characteristics of the ball at impact and in flight. Specifically, if the density is shifted or redistributed toward the center of the ball, the moment of inertia is reduced, and the initial spin rate of the ball as it leaves the golf club would increase due to lower resistance from the ball's moment of inertia. Conversely, if the density is shifted or redistributed toward the outer cover, the moment of inertia is increased, and the initial spin rate of the ball as it leaves the golf club would decrease due to the higher resistance from the ball's moment of inertia.

Soft compression cores have been demonstrated to not fully utilize their stored energy at high speeds. The golf ball 100, as shown in FIG. 13, has a mid to high flexural modulus inner casing layer (first cover layer) 102 sandwiched between two polybutadiene layers, a relatively hard inner core 101 and a generally soft outer core layer 103. This allows the release of more stored energy at high speeds. The golf ball 100 also includes an outer casing layer 104 and an outer cover 105 having dimples defined thereon.

Soft compression cores generally have a tendency to lack impact strength. The addition of the inner casing layer 102 between the polybutadiene inner core 101 and the outer core layer 103, also promotes improved impact resistance. A subsequent result of the addition of this inner casing layer 102, is that the overall specific gravity of the three layers 101-103 is reduced, therein allowing for the outer casing layer 104 to be more heavily filled. This affects the performance of the ball 100, in that the spin characteristics at high speeds are reduced.

The relatively hard inner core 101, is comprised of a polybutadiene material with a hardness compression of greater than 70 Atti, a specific gravity of less than 1.05 g/cc, and a diameter greater than 1.445 inches. The inner casing layer 102 is generally a thermoplastic Surlyn® material with a thickness less than 0.060 inch, preferably less than 0.040 inch, and most preferably less than 0.025 inch, and having a medium flexural modulus greater than about 30,000 psi and a Shore C hardness greater than 80. The outer core layer 103, encompasses the inner casing layer 102, and is comprised of a relatively soft polybutadiene material having less than 20 phr of a cross-linking material formed from the salt of an alpha, beta—ethylinically unsaturated carboxylic acid, such as a zinc diacrylate (ZDA), a specific gravity less than 1.05 g/cc and a thickness preferably of less than 0.050 inch, more preferably less than 0.040 inch and most preferably less than 0.030 inch. The outer casing layer 104 is generally a heavily filled thermoplastic Surlyn® having a filler that has a specific gravity heavier than the thermoplastic, the outer casing layer 104 having a flex modulus greater than 60,000 psi, preferably a thickness less than 0.030 inch and a specific gravity greater than 1.25 g/cc, more preferably a thickness less than 0.020 inch with a specific gravity greater than 2.25 g/cc, and most preferably a thickness of about 0.010 inch and a specific gravity greater than 3.2 g/cc. The ball 100 is completed by the outer cover 105, which preferably is a urethane material, having a thickness less than 0.40 inch and a Shore D less than 65.

The inner core 101 and the inner casing layer 102 may be formed from a thermoplastic material such as a partially or fully neutralized ionomer. The inner core 101 and the inner casing layer 102 also may be formed from an ionomer resin with a fully neutralized acid moiety.

The inner casing layer 102 between the two polybutadiene layers helps release stored energy of the inner core 101 at high speeds, also increases impact resistance, and reduces the spin characteristics of the ball 100.

Another aspect of the invention is shown in FIG. 14, wherein a golf ball 200 is comprised of a relatively soft specific gravity reduced inner core 201 polybutadiene material and a significantly larger core size of greater than about 1.445 inches. The thermoplastic inner casing 202 is disposed around the inner core 201 and is composed of a higher flexural modulus Surlyn®, preferably greater than 30,000 psi, with a thickness of less than 0.10 inch. In contrast with the embodiment illustrated in FIG. 13, this embodiment comprises a relatively thin, hard polybutadiene material for the outer core layer 203, with a thickness of this layer 203 less than 0.15 inch and a Shore D hardness of at least 30. The outer core layer 203 is comprised of a relatively soft polybutadiene material having less than 20 phr of a crosslinking material formed from the salt of an alpha, beta—ethylinically unsaturated carboxylic acid, such as a zinc diacrylate (ZDA), a specific gravity less than 1.10 g/cc and a thickness preferably of less than 0.150 inch, more preferably less than 0.040 inch and most preferably less than 0.030 inch. Preferably, the inner core 201 is made from a foamed material or a material having low specific gravity filler, such as hollow microspheres, incorporated therein. Preferably the specific gravity of the inner core 201 is less than 0.9 g/cc and more preferably less than 0.8 g/cc. The actual specific gravity of the inner core 201 depends on the weight distribution of the rest of the ball. The outer cover layer 204 is generally made from a relatively soft Surlyn® having a Shore D hardness of less than 65, and a thickness less than 0.040 inch.

The above inner casing layers 102 and outer core layer 203 may be formed from any thermoplastic material, preferred materials include partially or fully neutralized ionomers, such as polyurethane, polyurethane-ionomers, metallocene-polymers, or any as discussed in U.S. Pat. No. 5,919,100 as incorporated herein in its entirety. The inner core 201 and/or inner casing layer 202 may be formed from an ionomer resin with a fully neutralized acid moiety.

The cover layer is a resilient, non-reduced specific gravity layer. Suitable materials include urethane for the embodiment of FIG. 13 and a soft Surlyn® for the embodiment depicted in FIG. 14. The cover material is influential as it allows for tailoring of ball compression, coefficient of restitution, spin rate, etc. and are disclosed in U.S. Pat. Nos. 6,419,535, 6,152,834, 5,919,100, 5,885,172, and WO 00/23519. Ionomers, ionomer blends, thermosetting or thermoplastic polyurethanes, metallocenes are the preferred materials. The cover can be manufactured by a casting method, reaction injection molded, injected or compression molded, sprayed or dipped method.

The cover can be comprised of polymeric materials such as ionic copolymers of ethylene and an unsaturated monocarboxylic acid which are available under the trademark "SURLYN" of E. I. DuPont De Nemours & Company of Wilmington, Del. or "IOTEK" or "ESCOR" from Exxon. These are copolymers of ethylene and methacrylic acid or acrylic acid partially neutralized with zinc, sodium, lithium, magnesium, potassium, calcium, manganese, nickel or the like.

In accordance with a preferred embodiment of this invention, the cover in question can be formed from mixtures or blends of zinc and/or lithium and sodium ionic copolymers.

Preferably, the cover is comprised of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly (ethylene terephthalate), poly(butylene terephthalate), poly (ethylene vinyl alcohol), poly(tetrafluoroethylene) and their copolymers including functional comonomers and blends thereof. Still further, the cover is preferably comprised of a polyether or polyester thermoplastic urethane, a thermoset polyurethane, an ionomer such as acid-containing ethylene copolymer ionomers, including E/X/Y copolymers where E is ethylene, X is an acrylate or methacrylate-based softening comonomer present in 0-50 weight percent and Y is acrylic or methacrylic acid present in 5-35 weight percent. The acrylic or methacrylic acid is present in 16-35 weight percent, making the ionomer a high modulus ionomer, in 10-12 weight percent, making the ionomer a low modulus ionomer or in 13-15 weight percent, making the ionomer a standard ionomer. Generally, high acid ionomers provide a harder, more resilient ionomer. Covers made using high acid ionomers usually provide a high initial velocity and a low spin rate on the other hand, covers made with a low modulus ionomer are generally softer and provide greater spin and control.

Suitable materials for the thin heavily filled layer 104, as shown in FIG. 13, include any material that meets the specific gravity and thickness conditions stated above. The thin heavily filled layer 104 is preferably applied to the outer core layer 103 as a liquid solution, dispersion, lacquer, paste, gel, melt, etc., such as a loaded or filled natural or non-natural rubber latex, polyurethane, polyurea, epoxy, polyester, any reactive or non-reactive coating or casting material, and then cured, dried or evaporated down to the equilibrium solids level. The thin heavily filled layer 104 may also be formed by compression or injection molding, RIM, casting, spraying, dipping, powder coating, or any means of depositing materials onto the inner core. The thin heavily filled layer 104 may also be a thermoplastic polymer loaded with a specific gravity increasing filler, fiber, flake or particulate, such that it can be applied as a thin coating and meets the preferred specific gravity levels discussed above.

The cover for ball 200, as depicted in FIG. 14, can be made from the same materials as the cover for ball 100 discussed above. Preferably the inner core 201 has a diameter greater than 1.540 inches. The inner core has a PGA compression of preferably less than about 110, more preferably less than about 100, and most preferably less than about 90.

The weight of the ball according to the present invention is preferably about 1.620 ounces avoirdupois (45.92 gm) or less for low swing speed players. Further, the ball preferably does not cover an average distance in carry and roll exceeding 280 yards (256 m) plus a tolerance of 6% when tested on apparatus approved by the USGA on the outdoor range at the USGA Headquarters under the conditions set forth in the Overall Distance Standard for golf balls on file with the USGA.

The ball 10 has an overall COR value of greater than 0.790, preferably greater than 0.800 and a compression of less than 100, preferably less than 90. The outermost core layer 14 can function as a moisture barrier. It has a moisture vapor transmission rate less than that of the cover layer and more preferably similar to the moisture vapor transmission rate of an ionomer resin such as Surlyn®, which is in the range of about 0.45 to about 0.95 grams per mm/m$^2$ per day. The moisture vapor transmission rate is defined as: the mass of moisture vapor that diffuses into a material of a given thickness per unit area per unit time. The preferred standards of measuring the moisture vapor transmission rate include: ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others.

The above two examples are an improvement over the golf ball constructions of either U.S. patent application Ser. No. 09/948,692 or U.S. Pat. No. 6,494,795. The manipulation of moment of inertia via the filling (or foaming or otherwise reducing specific gravity) of the center 11 and inner laminate layers 12-14 provide the opportunity to further improve upon distance and spin. The low specific gravity center 11 or layers 12 or 13 can be made from a number of suitable materials, so long as the low specific gravity contributes to the soft compression and resilience of the golf ball. The material can be a thermosetting syntactic foam with hollow sphere fillers or micro-spheres in a polymeric matrix of epoxy, urethane, polyester or any suitable thermosetting binder, where the cured composition has a specific gravity less than 1.1 g/cc and preferably less than 1.0 g/cc. Additionally, any number of foamed or otherwise specific gravity reduced thermoplastic or thermosetting polymer compositions may also be used such as metallocene-catalyzed polymers and blends thereof described in U.S. Pat. Nos. 5,824,746 and 6,025,442 which are incorporated by reference herein in their entirety. Further, a thermoset polyurethane composition having a specific gravity or less than 1.0 g/cc such as a nucleated reaction injection molded or cast polyurethane may be used. Such a composition may result in a gas-filled or cellular solid layer.

As discussed in U.S. Pat. No. 5,971,870, which is incorporated by reference herein in its entirety, fillers may be or are typically in a finely divided form. For example, in a size generally less than about 20 mesh, preferably less than about 100 mesh U.S. standard size, except for fibers and flock, which are generally elongated, flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows:

| Filler Type | Sp. Gr. | Comments |
| --- | --- | --- |
| Precipitated hydrated silica | 2.0 | 1, 2 |
| Clay | 2.62 | 1, 2 |
| Talc | 2.85 | 1, 2 |
| Asbestos | 2.5 | 1, 2 |
| Glass fibers | 2.55 | 1, 2 |
| Aramid fibers (KEVLAR ®) | 1.44 | 1, 2 |
| Mica | 2.8 | 1, 2 |
| Calcium metasilicate | 2.9 | 1, 2 |
| Barium sulfate | 4.6 | 1, 2 |
| Zinc sulfide | 4.1 | 1, 2 |
| Lithopone | 4.2-4.3 | 1, 2 |
| Silicates | 2.1 | 1, 2 |
| Silicon carbide patelets | 3.18 | 1, 2 |
| Silicon carbide whiskers | 3.2 | 1, 2 |
| Tungsten carbide | 15.6 | 1 |
| Tungsten oxide | 5.8 | 1 |
| Diatomaceous earth | 2.3 | 1, 2 |
| Polyvinyl chloride | 1.41 | 1, 2 |
| Carbonates | | |
| Calcium carbonate | 2.71 | 1, 2 |
| Magnesium carbonate | 2.20 | 1, 2 |
| Metals and Alloys (powders) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |

-continued

| Filler Type | Sp. Gr. | Comments |
| --- | --- | --- |
| Molybdenum | 10.2 | 1 |
| Iron | 7.86 | 1 |
| Steel | 7.8-7.9 | 1 |
| Lead | 11.4 | 1, 2 |
| Copper | 8.94 | 1 |
| Brass | 8.2-8.4 | 1 |
| Boron | 2.34 | 1 |
| Boron carbide whiskers | 2.52 | 1, 2 |
| Bronze | 8.70-8.74 | 1 |
| Cobalt | 8.92 | 1 |
| Beryllium | 1.84 | 1 |
| Zinc | 7.14 | 1 |
| Tin | 7.31 | 1 |
| Metal Oxides | | |
| Zinc oxide | 5.57 | 1, 2 |
| Iron oxide | 5.1 | 1, 2 |
| Aluminum oxide | 4.0 | |
| Titanium oxide | 3.9-4.1 | 1, 2 |
| Magnesium oxide | 3.3-3.5 | 1, 2 |
| Zirconium oxide | 5.73 | 1, 2 |
| Metal Stearates | | |
| Zinc stearate | 1.09 | 3, 4 |
| Calcium stearate | 1.03 | 3, 4 |
| Barium stearate | 1.23 | 3, 4 |
| Lithium stearate | 1.01 | 3, 4 |
| Magnesium stearate | 1.03 | 3, 4 |
| Particulate carbonaceous materials | | |
| Graphite | 1.5-1.8 | 1, 2 |
| Carbon black | 1.8 | 1, 2 |
| Natural bitumen | 1.2-1.4 | 1, 2 |
| Cotton flock | 1.3-1.4 | 1, 2 |
| Cellulose flock | 1.15-1.5 | 1, 2 |
| Leather fiber | 1.2-1.4 | 1, 2 |
| Micro balloons | | |
| Glass | 0.15-1.1 | 1, 2 |
| Ceramic | 0.2-0.7 | 1, 2 |
| Fly ash | 0.6-0.8 | 1, 2 |
| Coupling Agents Adhesion Promoters | | |
| Titanates | 0.95-1.11 | |
| Zirconates | 0.92-1.11 | |
| Silane | 0.95-1.2 | |

1 Particularly useful for adjusting density of the inner cover layer.
2 Particularly useful for adjusting flex modulus of the inner cover layer.
3 Particularly useful for adjusting mold release of the inner cover layer.
4 Particularly useful for increasing melt flow index of the inner cover layer.

The increased hardness of the intermediate core layer 13 in reference to the innermost core layer 12 and the outermost core layer 14 provides the ball 10 with performance characteristics that have been associated primarily with dual cover layer golf balls using ionomer inner cover layers.

Table 1 sets forth the contents that can make-up the golf ball core in the first embodiment. The compositions used to prepare the golf ball core of this embodiment are all in parts per hundred (pph), based on 100 parts of polybutadiene. The fillers used in the compositions of these examples are regrind and barium sulfate (BaSO¼). Vulcup 40KE™. and Varox 231XL™, are free radical initiators, and are a-a bis (t-butylperoxy) diisopropylbenzene and 1,1-di(t-butylperoxy) 3,3,5-trimethyl cyclohexane, respectively.

TABLE 1

CORE COMPOSITIONS (pph)

| | Layer No. | | | | | | |
|---|---|---|---|---|---|---|---|
| | Center 1 | Center 2 | 1 | 2 | 3 | 4 | 5 |
| Polybutadiene | 100 | 100 | 100 | 100 | 100 | 100 | 100 |
| Polywate 325 | 26 | 13 | 23 | 18 | 13 | 26 | 36 |
| Vulcup 40KE ™ | 0.3 | 0.3 | 0.3 | 0.3 | 0.3 | 0.3 | 0.3 |
| Varox 231XL ™ | 0.6 | 0.6 | 0.5 | 0.5 | 0.5 | 0.6 | 0.6 |
| $BaSO_4$ | 31 | 25 | 26 | 25 | 25 | 31 | 35 |
| Zinc Diacrylate | 30 | 47 | 32 | 35 | 47 | 30 | 10 |
| SR-350 | 2 | 6 | 2 | 2 | 6 | 2 | 2 |
| Calcium Oxide | 3 | 0 | 0 | 0 | 0 | 3 | 3 |
| Zinc Oxide | 0 | 6 | 3 | 6 | 6 | 0 | 0 |

All the ingredients except the peroxides were mixed in a Process Lab Brabender mixer to about 180-200° F. Peroxides were added in the second stage to the initial mixture, and the resulting mixture was removed from the Brabender and blended on a lab mill to insure homogeneity. After mixing, the mixture was then hand rolled using a laboratory mill and cut into pieces or "preps". To make the core centers 11 the preps were then compression molded at about 160° C. for about 15 minutes. To fabricate the outer layers, polybutadiene rubber material was rolled into flat sheets and the sheets were stacked to form a laminate. The laminate was then compression molded around the centers as described above. To form the finished golf balls, the cores were ground and inserted into two cover hemispheres of materials that were suitable for use in a cover layer. These may include any number of partially or fully neutralized ionomers such as those disclosed in the parent application, or described in WO 00/23519, WO 01/29129. Also any thermosetting or thermoplastic polyurethanes or polyureas, including any aliphatic or aromatic polyether or polyester polyurethanes such as but not limited to those disclosed in U.S. Pat. Nos. 6,476,176; 6,309,313; 6,210,294; 6,117,024; 5,908,358; 5,929,189; and 5,334,673. Additionally, other suitable cover materials are disclosed in U.S. Pat. No. 5,919,100 and also in any of the co-pending applications referenced herein.

Referring back to the core layers 12, 13 and 14, these can be made of thermosetting or thermoplastic materials. For example, the first, second and third layers 12, 13 and 14 can be formed from thermoplastic elastomers, functionalized styrene-butadiene elastomers, thermoplastic rubbers, thermoset elastomers, thermoplastic urethanes, metallocene polymers, urethanes, or ionomer resins, or blends thereof.

The thermoplastic elastomers include dynamically vulcanized thermoplastic elastomers and blends thereof. Suitable dynamically vulcanized thermoplastic elastomers include Santoprene®., Sarlink®, Vyram®, Dytron® and Vistaflex®. Santoprene® is the trademark for a dynamically vulcanized PP/EPDM. Santoprene® 203-40 is an example of a preferred Santoprene® and is commercially available from Advanced Elastomer Systems.

Examples of suitable functionalized styrene-butadiene elastomers include Kraton FG-1901x and FG-1921x, available from the Shell Corporation. Examples of suitable thermoplastic polyurethanes include Estane® 58133, Estane® 58134 and Estane® 58144, which are available from the B.F. Goodrich Company. Further, the materials for the first, second and third layers 12, 13 and 14 described above may be in the form of a foamed polymeric material. For example, suitable metallocene polymers include foams of thermoplastic elastomers based on metallocene single-site catalyst-based foams. Such metallocene-based foams are commercially available from Sentinel Products of Hyannis, Mass.

Suitable thermoplastic polyetheresters include Hytrel® 3078, Hytrel® G3548W, and Hytrel® G4078W which are commercially available from DuPont. Suitable thermoplastic polyetheramides include Pebax® 2533, Pebax® 3533, Pebax® 1205 and Pebax®4033 which are available from Elf-Atochem. Suitable thermoplastic polyesters include polybutylene terephthalate.

Suitable thermoplastic ionomer resins are obtained by providing a cross metallic bond to polymers of monoolefin with at least one member selected from the group consisting of unsaturated mono- or di-carboxylic acids having 3 to 12 carbon atoms and esters thereof. The polymer contains 1 to 50% by weight of the unsaturated mono- or di-carboxylic acid and/or ester thereof. More particularly, low modulus ionomers, such as acid-containing ethylene copolymer ionomers, include E/X/Y copolymers where E is ethylene, X is a softening co-monomer such as acrylate or methacrylate present in 0-50 (preferably 0-25, most preferably 0-2), weight percent of the polymer, and Y is acrylic or methacrylic acid present in 5-35 (preferably 10-35, most preferably 15-35, making the ionomer a high acid ionomer) weight percent of the polymer, wherein the acid moiety is neutralized 1-100% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

Such ionomer resins include SURLYN ® and Iotek ®, which are commercially available from DuPont and Exxon, respectively. Likewise, other conventional materials such as balata, elastomer and polyethylene may also be used in the first, second and third layers 12, 13 and 14.

Such thermoplastic blends comprise about 1% to about 99% by weight of a first thermoplastic and about 99% to about 1% by weight of a second thermoplastic.

Preferably the thermoplastic blend comprises about 5% to about 95% by weight of a first thermoplastic and about 5% to about 95% by weight of a second thermoplastic. In a preferred embodiment of the present invention, the first thermoplastic material of the blend is a dynamically vulcanized thermoplastic elastomer, such as Santoprene®.

The properties such as hardness, Bayshore resilience, modulus, center diameter and layer thickness of the golf balls of the present invention have been found to affect play characteristics such as spin, initial velocity and feel of golf balls.

U.S. application Ser. No. 10/230,015, now U.S. Publication No. 20030114565, and U.S. application Ser. No. 10/108,793, now U.S. Publication No. 20030050373, which is incorporated by reference herein in its entirety, discusses soft, high resilient ionomers, which are preferably from neutralizing the acid copolymer(s) of at least one E/X/Y copolymer, where E is ethylene, X is the .alpha. beta. ethylenically unsaturated carboxylic acid, and Y is a softening co-monomer. X is preferably present in 2-30 (preferably 4-20, most preferably 5-15) wt. % of the polymer, and Y is preferably present in 17-40 (preferably 20-40, and more preferably 24-35) wt. % of the polymer. Preferably, the melt index (MI) of the base resin is at least 20, or at least 40, more preferably, at least 75 and most preferably at least 150. Particular soft, resilient ionomers included in this invention are partially neutralized ethylene/(meth) acrylic acid/butyl (meth) acrylate copolymers having an MI and level of neutralization that results in a melt processable polymer that has useful physical properties. The copolymers are at least partially neutralized. Preferably at least 40, or, more preferably at least 55, even more preferably about 70, and most preferably about 80 of the acid moiety of the acid copolymer is neutralized by one or more alkali metal, transition metal, or alkaline earth metal cations. Cations useful in making the ionomers of this invention comprise lithium, sodium, potassium, magnesium, calcium, barium, or zinc, or a combination of such cations.

The invention also relates to a "modified" soft, resilient thermoplastic ionomer that comprises a melt blend of (a) the acid copolymers or the melt processiible ionomers made therefrom as described above and (b) one or more organic acid(s) or salt(s) thereof, wherein greater than 80%, preferably greater than 90% of all the acid of (a) and of (b) is neutralized. Preferably, 100% of all the acid of (a) and (b) is neutralized by a cation source. Preferably, an amount of cation source in excess of the amount required to neutralize 100% of the acid in (a) and (b) is used to neutralize the acid in (a) and (b). Blends with fatty acids or fatty acid salts are preferred.

The organic acids or salts thereof are added in an amount sufficient to enhance the resilience of the copolymer. Preferably, the organic acids or salts thereof are added in an amount sufficient to substantially remove remaining ethylene crystallinity of the copolymer.

Preferably, the organic acids or salts are added in an amount of at least about 5% (weight basis) of the total amount of copolymer and organic acid(s). More preferably, the organic acids or salts thereof are added in an amount of at least about 15%, even more preferably at least about 20%. Preferably, the organic acid(s) are added in an amount up to about 50% (weight basis) based on the total amount of copolymer and organic acid. More preferably, the organic acids or salts thereof are added in an amount of up to about 40%, more preferably, up to about 35%. The non-volatile, non-migratory organic acids preferably are one or more aliphatic, mono-functional organic acids or salts thereof as described below, particularly one or more aliphatic, monofunctional, saturated or unsaturated organic acids having less than 36 carbon atoms or salts of the organic acids, preferably stearic acid or oleic acid. Fatty acids or fatty acid salts are most preferred.

Processes for fatty acid (salt) modifications are known in the art. Particularly, the modified highly-neutralized soft, resilient acid copolymer ionomers of this invention can be produced by:

(a) melt-blending (1) ethylene, .alpha.,.beta. ethylenically unsaturated C.sub.3-8 carboxylic acid copolymer(s) or melt-processible ionomer(s) thereof that have their crystallinity disrupted by addition of a softening monomer or other means with (2) sufficient non-volatile, non-migratory organic acids to substantially enhance the resilience and to disrupt (preferably remove) the remaining ethylene crystallinity, and then concurrently or subsequently (b) Adding a sufficient amount of a cation source to increase the level of neutralization of all the acid moieties (including those in the acid copolymer and in the organic acid if the non-volatile, non-migratory organic acid is an organic acid) to the desired level.

The weight ratio of X to Y in the composition is at least about 1:20. Preferably, the weight ratio of X to Y is at least about 1:15, more preferably, at least about 1:10. Furthermore, the weight ratio of X to Y is up to about 1:1.67, more preferably up to about 1:2. Most preferably, the weight ratio of X to Y in the composition is up to about 1:2.2.

The acid copolymers used in the present invention to make the ionomers are preferably 'direct' acid copolymers (containing high levels of softening monomers). As noted above, the copolymers are at least partially neutralized, and preferably at least about 40% of X in the composition is neutralized. More preferably, at least about 55% of X is neutralized. Even more preferably, at least about 70%, and most preferably, at least about 80% of X is neutralized. In the event that the copolymer is highly neutralized (e.g., to at least 45%, preferably 50%, 55%, 70%, or 80%, of acid moiety), the MI of the acid copolymer should be sufficiently high so that the resulting neutralized resin has a measurable MI in accord with ASTM D-1238, condition E, at 190° C., using a 2160 gram weight. Preferably this resulting MI will be at least 0.1, preferably at least 0.5, and more preferably 1.0 or greater. Preferably, for highly neutralized acid copolymer, the MI of the acid copolymer base resin is at least 20, or at least 40, at least 75, and more preferably at least 150.

The acid copolymers preferably comprise alpha olefin, particularly ethylene, C.sub.3-8 .alpha. .beta. ethylenically unsaturated carboxylic acid, particularly acrylic and methacrylic acid, and softening monomers, selected from alkyl acrylate, and alkyl methacrylate, wherein the alkyl groups have from 1-8 carbon atoms, copolymers. By "softening", it is meant that the crystallinity is disrupted (the polymer is made less crystalline). While the alpha olefin can be a C.sub.2-C.sub.4 alpha olefin, ethylene is most preferred for use in the present invention. Accordingly, it is described and illustrated herein in terms of ethylene as the alpha olefin.

The acid copolymers, when the alpha olefin is ethylene, can be described as E/X/Y copolymers where E is ethylene, X is the alpha beta ethylenically unsaturated carboxylic acid, and Y is a softening co-monomer X is preferably present in 2-30 (preferably 4-20, most preferably 5-15) wt. % of the polymer, and Y is preferably present in 17-40 (preferably 20-40, most preferably 24-35) wt. % of the polymer.

The ethylene-acid copolymers with high levels of acid (X) are difficult to prepare in continuous polymerizers because of monomer-polymer phase separation. This difficulty can be avoided however by use of "co-solvent technology" as described in U.S. Pat. No. 5,028,674, or by employing somewhat higher pressures than those which copolymers with lower acid can be prepared.

Specific acid-copolymers include ethylene/(meth) acrylic acid/n-butyl (meth) acrylate, ethylene/(meth) acrylic acid/iso-butyl (meth) acrylate, ethylene/(meth) acrylic acid/methyl (meth) acrylate, and ethylene/(meth) acrylic acid/ethyl (meth) acrylate terpolymers.

The organic acids employed are aliphatic, mono-functional (saturated, unsaturated, or multi-unsaturated) organic acids, particularly those having fewer than 36 carbon atoms. Also salts of these organic acids may be employed. Fatty acids or fatty acid salts are preferred. The salts may be any of a wide variety, particularly including the barium, lithium, sodium, zinc, bismuth, potassium, strontium, magnesium or calcium salts of the organic acids. Particular organic acids useful in the present invention include caproic acid, caprylic acid, capric acid, lauric acid, stearic acid, behenic acid, erucic acid, oleic acid, and linoleic acid.

The optional filler component is chosen to impart additional density to blends of the previously described components, the selection being dependent upon the different parts (e.g., cover, mantle, core, center, intermediate layers in a multilayered core or ball) and the type of golf ball desired (e.g., one-piece, two-piece, three-piece or multiple-piece ball), as will be more fully detailed below.

Generally, the filler will be inorganic having a density greater than about 4 grams/cubic centimeter (gm/cc), preferably greater than 5 gm/cc, and will be present in amounts between 0 to about 60 wt. % based on the total weight of the composition. Examples of useful fillers include zinc oxide, barium sulfate, lead silicate and tungsten carbide, as well as the other well-known fillers used in golf balls. It is preferred that the filler materials be non-reactive or almost non-reactive and not stiffen or raise the compression nor reduce the coefficient of restitution significantly.

Additional optional additives useful in the practice of the subject invention include acid copolymer wax (e.g., Allied wax AC 143 believed to be an ethylene/16-18% acrylic acid copolymer with a number average molecular weight of 2,040), which assist in preventing reaction between the filler materials (e.g., ZnO) and the acid moiety in the ethylene copolymer. Other optional additives include $TiO_2$, which is used as a whitening agent; optical brighteners; surfactants; processing aids; etc.

Ionomers may be blended with conventional ionomeric copolymers (di-, ter-, etc.), using well-known techniques, to manipulate product properties as desired. The blends would still exhibit lower hardness and higher resilience when compared with blends based on conventional ionomers.

Also, ionomers can be blended with non-ionic thermoplastic resins to manipulate product properties. The non-ionic thermoplastic resins would, by way of non-limiting illustrative examples, include thermoplastic elastomers, such as polyurethane, poly-ether-ester, poly-amide-ether, polyether-urea, PEBAX (a family of block copolymers based on polyether-block-amide, commercially suppled by Atochem), styrene-butadiene-styrene (SBS) block copolymers, styrene(ethylene-butylene)-styrene block copolymers, etc., poly amide (oligomeric and polymeric), polyesters, polyolefins including PE, PP, E/P copolymers, etc., ethylene copolymers with various comonomers, such as vinyl acetate, (meth)acrylates, (meth)acrylic acid, epoxy-functionalized monomer, CO, etc., functionalized polymers with maleic anhydride grafting, epoxidization etc., elastomers, such as EPDM, metallocene catalyzed PE and copolymer, ground up powders of the thermoset elastomers, etc. Such thermoplastic blends comprise about 1% to about 99% by weight of a first thermoplastic and about 99% to about 1% by weight of a second thermoplastic.

Additionally, the compositions of U.S. application Ser. No. 10/269,341, now U.S. Publication No. 20030130434 and U.S. Pat. No. 6,653,382, both of which are incorporated herein in their entirety, discuss compositions having high COR when formed into solid spheres.

The thermoplastic composition of this invention comprises a polymer which, when formed into a sphere that is 1.50 to 1.54 inches in diameter, has a coefficient of restitution (COR) when measured by firing the sphere at an initial velocity of 125 feet/second against a steel plate positioned 3 feet from the point where initial velocity and rebound velocity are determined and by dividing the rebound velocity from the plate by the initial velocity and an Atti compression of no more than 100.

The thermoplastic composition of this invention preferably comprises (a) aliphatic, mono-functional organic acid(s) having fewer than 36 carbon atoms; and (b) ethylene, $C_3$ to $C_8$ $\alpha,\beta$ ethylenically unsaturated carboxylic acid copolymer(s) and ionomer(s) thereof, wherein greater than 90%, preferably near 100%, and more preferably 100% of all the acid of (a) and (b) are neutralized.

The thermopastic composition preferably comprises melt-processible, highly-neutralized (greater than 90%, preferably near 100%, and more preferably 100%) polymer of (1) ethylene, $C_3$ to $C_8$ $\alpha,\beta$ ethylenically unsaturated carboxylic acid copolymers that have their crystallinity disrupted by addition of a softening monomer or other means such as high acid levels, and (2) non-volatile, non-migratory agents such as organic acids (or salts) selected for their ability to substantially or totally suppress any remaining ethylene crystallinity. Agents other than organic acids (or salts) may be used.

It has been found that, by modifying an acid copolymer or ionomer with a sufficient amount of specific organic acids (or salts thereof); it is possible to highly neutralize the acid copolymer without losing processibility or properties such as elongation and toughness. The organic acids employed in the present invention are aliphatic, mono-functional, saturated or unsaturated organic acids, particularly those having fewer than 36 carbon atoms, and particularly those that are non-volatile and non-migratory and exhibit ionic array plasticizing and ethylene crystallinity suppression properties.

With the addition of sufficient organic acid, greater than 90%, nearly 100%, and preferably 100% of the acid moieties in the acid copolymer from which the ionomer is made can be neutralized without losing the processibility and properties of elongation and toughness.

The melt-processible, highly-neutralized acid copolymer ionomer can be produced by the following:
  (a) melt-blending (1) ethylene $\alpha,\beta$ ethylenically unsaturated $C_{3-8}$ carboxylic acid copolymer(s) or melt-processible ionomer(s) thereof (ionomers that are not neutralized to the level that they have become intractable, that is not melt-processible) with (1) one or more aliphatic, mono-functional, saturated or unsaturated organic acids having fewer than 36 carbon atoms or salts of the organic acids, and then concurrently or subsequently (b) Adding a sufficient amount of a cation source to increase the level of neutralization all the acid moieties (including those in the acid copolymer and in the organic acid) to greater than 90%, preferably near 100%, more preferably to 100%.

Preferably, highly-neutralized thermoplastics of the invention can be made by:

(a) melt-blending (1) ethylene, .alpha.,.beta. ethylenically unsaturated C.sub.3-8 carboxylic acid copolymer(s) or melt-processible ionomer(s) thereof that have their crystallinity disrupted by addition of a softening monomer or other means with (2) sufficient non-volatile, non-migratory agents to substantially remove the remaining ethylene crystallinity, and then concurrently or subsequently (b) Adding a sufficient amount of a cation source to increase the level of neutralization all the acid moieties (including those in the acid copolymer and in the organic acid if the non-volatile, non-migratory agent is an organic acid) to greater than 90%, preferably near 100%, more preferably to 100%.

The acid copolymers used in the present invention to make the ionomers are preferably 'direct' acid copolymers. They are preferably alpha olefin, particularly ethylene, C.sub.3-8 .alpha.,.beta. ethylenically unsaturated carboxylic acid, particularly acrylic and methacrylic acid, copolymers. They may optionally contain a third softening monomer. By "softening", it is meant that the crystallinity is disrupted (the polymer is made less crystalline). Suitable "softening" co-monomers are monomers selected from alkyl acrylate, and alkyl methacrylate, wherein the alkyl groups have from 1-8 carbon atoms.

The acid copolymers, when the alpha olefin is ethylene, can be described as E/X/Y copolymers where E is ethylene, X is the .alpha.,.beta. ethylenically unsaturated carboxylic acid, and Y is a softening comonomer. X is preferably present in 3-30 (preferably 4-25, most preferably 5-20) wt. % of the polymer, and Y is preferably present in 0-30 (alternatively 3-25 or 10-23) wt. % of the polymer.

Spheres were prepared using fully neutralized ionomers A and B.

TABLE 2

| Sample | Resin Type (%) | Acid Type (%) | Cation (% neut*.) | M.I. g./10 min |
|---|---|---|---|---|
| 1A | A(60) | OLEIC(40) | Mg(100) | 1.0 |
| 2B | A(60) | OLEIC(40) | Mg(105)* | 0.9 |
| 3C | B(60) | OLEIC(40) | Mg(100) | 0.9 |
| 4D | B(60) | OLEIC(40) | Mg(105)* | 0.9 |
| 5E | B(60) | STEARIC(40) | Mg(100) | 0.85 |

A—ethylene, 14.8% normal butyl acrylate, 8.3% acrylic acid
B—ethylene, 14.9% normal butyl acrylate, 10.1% acrylic acid
*indicates that cation was sufficient to neutralize 105% of all the acid in the resin and the organic acid.

These compositions were molded into 1.53 inch diameter spheres for which data is presented in the following table.

TABLE 3

| Sample | Atti Compression | COR @ 125 FT/SEC |
|---|---|---|
| 1A | 75 | .826 |
| 2B | 75 | .826 |

TABLE 3-continued

| Sample | Atti Compression | COR @ 125 FT/SEC |
|---|---|---|
| 3C | 78 | .837 |
| 4D | 76 | .837 |
| 5E | 97 | .807 |

Further testing of commercially available highly neutralized polymers HNP1 and HNP2 had the following properties.

TABLE 4

Material Properties

| | HNP1 | HNP2 |
|---|---|---|
| Specific Gravity (g/cc) | 0.966 | 0.974 |
| Melt Flow @ 190 C. Kg load | 0.65 | 1.0 |
| Shore D Flex Bar (40 hr) | 47.0 | 46.0 |
| Shore D Flex Bar (2 week) | 51.0 | 48.0 |
| Flex Modulus Kpsi (40 hr) | 25.8 | 16.1 |
| Flex Modulus Kpsi (2 week) | 39.9 | 21.0 |
| DSC Melting Point (° C.) | 61.0 | 61/101 |
| Moisture (ppm) | 1500 | 4500 |
| Wt % Mg | 2.65 | 2.96 |

SOLID SPHERE DATA

| | MATERIAL | | | | |
|---|---|---|---|---|---|
| | HNP1 | HNP2 | HNP2 | HNP1 | HNP1/HNP2 |
| Specific Gravity (g/cc) | 0.954 | 0.959 | 1.153 | 1.146 | 1.148 |
| Filler Type | None | None | Tungsten | Tungsten | Tungsten |
| Compression | 107 | 83 | 86 | 62 | 72 |
| CoR | 0.827 | 0.853 | 0.844 | 0.806 | 0.822 |
| Shore D | 51 | 47 | 49 | 42 | 45 |
| Shore C | | | 79 | 72 | 75 |

These materials are exemplary examples of the preferred center and/or core layer compositions of the present invention. They may also be used as a cover layer herein.

The golf ball of the present invention can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

While it is apparent that the illustrative embodiments of the invention herein disclosed fulfill the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

What is claimed is:

1. A golf ball comprising:
 a thermoplastic inner core having a specific gravity of less than 1.05 g/cc with a compression of greater than 70;

an thermoplastic inner casing layer disposed around the inner core, the inner casing layer having a flexural modulus greater than 30,000 psi, a Shore C hardness greater than 80, and a thickness less than about 0.060 inch;

an outer core layer encompassing the inner casing layer, the outer core layer having a flexural modulus of less than 30 kpsi, a Shore C hardness less than 80, a specific gravity of less than 1.05 g/cc, and a thickness less than about 0.050 inch;

an outer casing layer having a flex modulus greater than 60 kpsi, a thickness less than about 0.030 inch, and a specific gravity greater than 1.25 g/cc; and an outer cover having a hardness of less than 65 Shore D, and a thickness less than 0.040 inch.

2. The golf ball according to claim 1, wherein the specific gravity of the outer casing layer is greater than 2.0 g/cc.

3. The golf ball according to claim 1, wherein the inner core is formed from a fully neutralized ionomer.

4. The golf ball according to claim 1, wherein the inner core is formed from an ionomer resin with a fully neutralized acid moiety.

5. The golf ball according to claim 1, wherein the inner casing is formed from a fully neutralized ionomer.

6. The golf ball according to claim 1, wherein the inner casing layer is formed from an ionomer resin with a fully neutralized acid moiety.

7. The golf ball according to claim 1, wherein the inner casing has a thickness of less than 0.030 inch.

8. The golf ball according to claim 1, wherein the inner casing has a thickness of less than 0.025 inch.

9. The golf ball according to claim 1, wherein the outer core layer is formed from a thermoplastic material.

10. The golf ball according to claim 9, wherein the outer core layer has a thickness of less than 0.040 inch.

11. The golf ball according to claim 9, wherein the outer core layer has a thickness of less than 0.030 inch.

12. The golf ball according to claim 1, wherein the outer casing layer is formed from a thermoplastic polymer comprising a filler having a specific gravity greater than the thermoplastic polymer.

13. The golf ball according to claim 12, wherein the outer casing layer has a thickness of less than 0.020 inch and a specific gravity greater than 2.25 g/cc.

14. The golf ball according to claim 12, wherein the outer casing layer has a thickness of less than 0.010 inch and a specific gravity greater than 3.2 g/cc.

15. The golf ball according to claim 1, wherein the outer cover comprises polyurethane or polyurea.

16. A golf ball comprising:

a thermoplastic inner core having a specific gravity of less than 1.2 g/cc with a compression of less than 70;

a thermoplastic inner casing disposed around the inner core, the inner casing having a flexural modulus greater than 30,000 psi, and a thickness of less than 0.10 inch;

an outer core layer having a specific gravity of less than 1.10 g/cc, a thickness of less than about 0.15 inch, and a Shore D hardness of at least 30; and an outer cover layer having a Shore D hardness of less than 65, and a thickness of less than 0.04 inch.

17. The golf ball according to claim 16, wherein the outer core layer is formed from a composition comprising a thermoplastic material.

18. The golf ball according to claim 16, wherein the inner core has a specific gravity of less than 1.05 g/cc.

19. The golf ball according to claim 16, wherein the outer core layer has a thickness of less than 0.10 inch.

20. The golf ball according to claim 16, wherein the outer core layer has a Shore D hardness of greater than 40.

21. The golf ball according to claim 16, wherein the inner core is formed from a fully neutralized ionomer.

22. The golf ball according to claim 16, wherein the inner core is formed from an ionomer resin with a fully neutralized acid moiety.

23. The golf ball according to claim 17, wherein the outer core layer is formed from a fully neutralized ionomer.

24. The golf ball according to claim 23, wherein the outer core layer is formed from an ionomer resin with a fully neutralized acid moiety.

25. A golf ball according to claim 24, wherein the inner casing layer is formed from an ionomer resin having a fully neutralized acid moiety.

* * * * *